US012755229B2

(12) United States Patent
Kunwar et al.

(10) Patent No.: US 12,755,229 B2
(45) Date of Patent: Oct. 6, 2026

(54) MACHINE LEARNING BASED SYSTEMS AND METHODS FOR FORECASTING CASH FLOW FOR A PROFESSIONAL EMPLOYER ORGANIZATION

(71) Applicant: HIGHRADIUS CORPORATION, Houston, TX (US)

(72) Inventors: Anupam Kunwar, Hyderabad (IN); Aravind Mvss, Hyderabad (IN); Apoorva Shrivastava, Hyderabad (IN); Maitreya Mohapatra, Hyderabad (IN)

(73) Assignee: HIGHRADIUS CORPORATION

( * ) Notice: Subject to any disclaimer, the term of this patent is extended or adjusted under 35 U.S.C. 154(b) by 129 days.

(21) Appl. No.: 18/399,764

(22) Filed: Dec. 29, 2023

(65) Prior Publication Data

US 2025/0217746 A1 Jul. 3, 2025

(51) Int. Cl.
*G06Q 10/0637* (2023.01)
*G06Q 40/12* (2023.01)

(52) U.S. Cl.
CPC ......... *G06Q 10/0637* (2013.01); *G06Q 40/12* (2013.12); *G06Q 40/125* (2013.12)

(58) Field of Classification Search
CPC .................................................. G06Q 10/0637
See application file for complete search history.

(56) References Cited

U.S. PATENT DOCUMENTS 11,526,859 B1 * 12/2022 Cousins ................. G06Q 20/02
11,640,609 B1 * 5/2023 Shoumaker .............. G06N 7/01 706/46
12,244,583 B1 * 3/2025 Kurani .................. H04L 63/102
2019/0180358 A1 * 6/2019 Nandan ............... G06F 18/2113
2020/0279198 A1 * 9/2020 Turner ................... G06Q 40/06
(Continued)

FOREIGN PATENT DOCUMENTS

WO WO-2021257610 A1 * 12/2021 ....... G06Q 10/06393

OTHER PUBLICATIONS

Ester, Martin, et al. "A density-based algorithm for discovering clusters in large spatial databases with noise." kdd. vol. 96. No. 34. 1996. https://cdn.aaai.org/KDD/1996/KDD96-037.pdf?source=post_page (Year: 1996).*

*Primary Examiner* — Hamzeh Obaid
*Assistant Examiner* — Reed M. Bond
(74) *Attorney, Agent, or Firm* — Jason C. Cameron

(57) ABSTRACT

A machine learning based computing method for computing future cash flow for first users, is disclosed. The machine learning based computing method includes: receiving inputs from second users; extracting data associated with cash flow data of the first users and second information associated with third users, from databases based on the inputs; generating features associated with the third users based on the extracted data; generating clusters associated with the third users of entities associated with the first users based on the features, using a machine learning model; computing future cash flow for the clusters associated with the third users by adding the future cash flow determined for each cluster associated with the third users, for entities associated with the first customers; and providing an output of the future cash flow for the entities associated with the first users, to second users on user interface associated with electronic devices.

14 Claims, 7 Drawing Sheets

(56) References Cited

U.S. PATENT DOCUMENTS

| | | | | |
|---|---|---|---|---|
| 2021/0034712 | A1* | 2/2021 | Dasgupta | G06F 30/20 |
| 2021/0224700 | A1* | 7/2021 | Wang | G06N 3/044 |
| 2022/0147895 | A1* | 5/2022 | Katz | G06F 18/214 |
| 2023/0306515 | A1* | 9/2023 | Styles | G06Q 40/06 |
| 2023/0368196 | A1* | 11/2023 | Nath | G06N 3/09 |
| 2023/0385820 | A1* | 11/2023 | Doan | G06Q 40/06 |
| 2024/0420103 | A1* | 12/2024 | Coles | G06N 20/00 |

* cited by examiner

400

MACHINE LEARNING BASED SYSTEMS AND METHODS FOR FORECASTING CASH FLOW FOR A PROFESSIONAL EMPLOYER ORGANIZATION

FIELD OF INVENTION

Embodiments of the present disclosure relate to machine learning based (ML-based) computing systems, and more particularly relates to a ML-based computing method and system for computing future cash flow for one or more first users (e.g., professional employer organizations).

BACKGROUND

A professional employer organization (PEO) is a human resources entity that is an employee's employer of record and undertakes specific business functions and enhances employee benefits. As an employer of record, the professional employer organization (PEO) shares employer responsibilities with its client companies who receive services from the employee. The professional employer organization (PEO) offers a range of services, including at least one of: payroll, tax management, compliance, risk management, talent management, and the like.

Cash flow prediction is critical for managing finances of the professional employer organizations (PEO). By predicting a future cash flow, the professional employer organization (PEO) can anticipate when the businesses will have cash on hand and when the businesses will need to borrow money to meet financial obligations. Accurate cash flow predictions can help the businesses to avoid cash shortages. There are several industry-standard methods for predicting cash flow in organizations, including at least one of: a rolling average approach, an alternate weeks seasonality approach, a week of year average approach, and the like.

However, the professional employer organizations (PEO) exhibit a unique cash flow cycle characterized by shorter payment terms, usually spanning 2-4 days. The professional employer organizations (PEO) set these shorter payment terms as the professional employer organizations (PEO) need to make timely payments to client's employees, tax authorities, insurance providers, and other relevant entities on behalf of their client companies. Due to the unique cash flow of the professional employer organizations (PEO), the industry standard methods cannot be used for predicting the cash flow for the professional employer organizations (PEO).

Hence, there is a need for an improved machine learning based (ML-based) computing system and method for computing future cash flow for one or more first users, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) computing method for computing future cash flow for one or more first users, is disclosed. The ML-based computing method comprises receiving, by one or more hardware processors, one or more inputs from one or more second users. The one or more inputs comprise first information related to at least one of: one or more entities associated with the one or more first users, and a forecast period associated with a time duration during which the one or more second users are adapted to compute the future cash flow for the one or more entities associated with the one or more first users.

The ML-based computing method further comprises extracting, by the one or more hardware processors, one or more data associated with at least one of: one or more cash flow data of the one or more first users and second information associated with one or more third users, from one or more databases based on the one or more inputs received from the one or more second users. The cash flow data comprise at least one of: one or more historical cash flow data and one or more real-time cash flow data.

The ML-based computing method further comprises generating, by the one or more hardware processors, one or more features associated with the one or more third users based on the extracted one or more data associated with the one or more cash flow data of the one or more first users and the second information associated with one or more third users. The one or more features comprise at least one of: one or more frequency-based features, one or more distance-based features, and one or more seasonality-based features.

The ML-based computing method further comprises generating, by the one or more hardware processors, one or more clusters associated with the one or more third users of the one or more entities associated with the one or more first users based on the one or more features, using at least one machine learning model.

The ML-based computing method further comprises determining, by the one or more hardware processors, the future cash flow for each cluster of the one or more clusters associated with the one or more third users.

The ML-based computing method further comprises computing, by the one or more hardware processors, the future cash flow for the one or more clusters associated with the one or more third users by adding the future cash flow determined for each cluster of the one or more clusters associated with the one or more third users, for the one or more entities associated with the one or more first customers.

The ML-based computing method further comprises providing, by the one or more hardware processors, an output of the computed future cash flow for the one or more entities associated with the one or more first users, to the one or more second users on a user interface associated with one or more electronic devices.

In an embodiment, the one or more first users comprise at least one of: one or more organizations, one or more corporations, one or more parent companies, one or more subsidiaries, one or more joint ventures, one or more partnerships, one or more governmental bodies, one or more associations, and one or more legal entities. The one or more second users comprises at least one of: one or more data analysts, one or more business analysts, one or more cash analysts, one or more financial analysts, one or more collection analysts, one or more debt collectors, and one or more professionals associated with cash and collection management.

The one or more third users comprises at least one of: one or more employees of the one or more first users, the one or more employees in each department, the one or more employees in each geographical location, the one or more employees in each hierarchy comprising a top level management with the one or more employees, a middle level management with the one or more employees, and one or more frontline employees In another embodiment, the second information associated with the one or more third users comprises at least one of: one or more identities associated with the one or more third users, one or more basic salaries, one or more allowances, one or more deductions, one or more overtime pays, one or more bonuses, one or more commissions, one or more benefits, one or more pay periods, one or more taxes, and one or more net salaries.

In yet another embodiment, generating, by the one or more hardware processors, the one or more features based on the extracted one or more data associated with the one or more cash flow data of the one or more first users and the second information associated with the one or more third users, comprises: (a) generating, by the one or more hardware processors, the one or more frequency-based features based on at least one of: first payment frequency and second payment frequency, made to the one or more third users; (b) generating, by the one or more hardware processors, the one or more distance-based features based on at least one of: a distance from start of the one or more months and end of the one or more months, a distance from start of a quarter time period and end of the quarter time period, a distance from a predefined day of the one or more months, a distance from a last business day of the one or more months, and a distance from a last transaction; and (c) generating, by the one or more hardware processors, the one or more seasonality-based features based on at least one of: a mode of one or more days of the one or more months and the mode of one or more weekdays.

The first payment frequency is an average payment gap between one or more payrolls of the one or more third users. The second payment frequency is a recurrent payment day indicating a common day of one or more months on which one or more historical payrolls are performed for the one or more third users. The mode of one or more days of the one or more months is configured to identify a recurrent day in the one or more months for the one or more third users based on the one or more historical payrolls. The mode of the one or more weekdays is configured to determine the recurrent day of one or more weeks for one or more payroll transactions by filtering one or more noises comprising at least one of: one or more holidays and one or more bank issues.

In yet another embodiment, the ML-based computing method further comprises training, by the one or more hardware processors, the at least one machine learning model, by: (a) receiving, by the one or more hardware processors, one or more training datasets associated with the one or more features, from a cluster feature generation subsystem; and (b) pre-processing, by the one or more hardware processors, the one or more training datasets associated with the one or more features to convert one or more numerical values of the one or more features to one or more common scale values by at least one of: (i) normalizing, by the one or more hardware processors, the one or more numerical values of the one or more features to one or more standardized ranges comprising zero and one; and (ii) standardizing, by the one or more hardware processors, the one or more numerical values of the one or more features to obtain a mean value of zero and a standard deviation of one.

In yet another embodiment, the at least one machine learning model comprises a density-based spatial clustering of applications with noise (DBSCAN) model. The density-based spatial clustering of applications with noise (DBSCAN) model is trained by: (a) receiving, by the one or more hardware processors, the pre-processed one or more training datasets associated with the one or more features; (b) selecting, by the one or more hardware processors, one or more first hyperparameters for training the density-based spatial clustering of applications with noise (DBSCAN) model; (c) generating, by the one or more hardware processors, one or more first clustering models to automatically group the one or more third users comprising one or more analogical characteristics, based on the selected one or more first hyperparameters; (d) scanning, by the one or more hardware processors, the grouped one or more third users comprising the one or more analogical characteristics, with the one or more first data points to identify at least one of: the one or more first dense regions as the one or more clusters and one or more isolated first data points as the one or more noises; (e) computing, by the one or more hardware processors, one or more pairwise distances between the one or more first data points; (f) determining, by the one or more hardware processors, whether the one or more first data points satisfy a predetermined criteria of the one or more first hyperparameters; and (f) classifying, by the one or more hardware processors, the one or more first data points as at least one of: one or more first core data points indicating the one or more clusters, one or more first border data points, and one or more first noise data points indicating the one or more noises.

The one or more first hyperparameters comprise at least one of: epsilon hyperparameter and minimum samples hyperparameter. The epsilon hyperparameter indicates a radius within which one or more first data points are indicated as one or more neighbors. The minimum sample hyperparameter is configured to generate one or more first dense regions by determining a predetermined number of the one or more first data points required within the radius.

In yet another embodiment, the ML-based computing method further comprises validating, by the one or more hardware processors, the density-based spatial clustering of applications with noise (DBSCAN) model based on one or more validation datasets. In an embodiment, validating the density-based spatial clustering of applications with noise (DBSCAN) model comprises: (a) determining, by the one or more hardware processors, whether one or more first results of the one or more clusters associated with the one or more third users satisfy one or more first predetermined threshold results; and performing, by the one or more hardware processors, one or more first processes comprising at least one of: preprocessing of the one or more training datasets associated with the one or more features, adjusting of the one or more features, and adjusting of the one or more first hyperparameters, until the one or more first results of the one or more clusters associated with the one or more third users satisfy the one or more first predetermined threshold results.

In yet another embodiment, the at least one machine learning model comprises a K-means clustering model, the K-means clustering model is trained by: (a) receiving, by the one or more hardware processors, the pre-processed one or more training datasets associated with the one or more features; (b) selecting, by the one or more hardware processors, one or more second hyperparameters, including the initial number of cluster centers (centroids), for training the K-means clustering model; (c) assigning, by the one or more hardware processors, one or more data points in the one or more training datasets to the closest centroid to automatically group the one or more third users comprising one or more analogical characteristics, based on the selected one or more second hyperparameters; (d) re-computing, by the one or more hardware processors, the centroids of each cluster by determining an average of the one or more data points in the one or more clusters; (e) repeating, by the one or more hardware processors, the assignment of the one or more data points and re-computation of centroids steps until the centroids remain unchanged significantly; and (f) classifying, by the one or more hardware processors, the one or more first data points as the one or more clusters associated with the one or more third users.

In yet another embodiment, the ML-based computing method further comprises validating, by the one or more hardware processors, the K-means clustering model based on the one or more validation datasets. In an embodiment, validating the K-means clustering model comprises: (a) determining, by the one or more hardware processors, whether one or more second results of the one or more clusters associated with the one or more third users satisfy one or more second predetermined threshold results; and (b) performing, by the one or more hardware processors, one or more second processes comprising at least one of: preprocessing of the one or more training datasets associated with the one or more features, adjusting of the one or more features, and adjusting of the one or more second hyperparameters, until the one or more second results of the one or more clusters associated with the one or more third users satisfy the one or more second predetermined threshold results.

In yet another embodiment, the ML-based computing method further comprises re-training, by the one or more hardware processors, the at least one machine learning model over a plurality of time intervals based on one or more training data. In an embodiment, re-training the at least one machine learning model over the plurality of time intervals, comprises: (a) receiving, by the one or more hardware processors, the one or more training data associated with third information associated with the one or more third users, from the output subsystem; (b) adding, by the one or more hardware processors, the one or more training data with the one or more original training datasets comprising the second information associated with the one or more third users to generate one or more updated training datasets; (c) re-training, by the one or more hardware processors, the at least one machine learning model to update one or more training configurations of a cluster generation subsystem; and (d) executing, by the one or more hardware processors, the at least one re-trained machine learning model in the cluster generation subsystem to generate the one or more clusters associated with the one or more third users.

In one aspect, a machine learning based (ML-based) computing system for computing future cash flow for one or more first users, is disclosed. The ML-based computing system includes one or more hardware processors and a memory coupled to the one or more hardware processors. The memory includes a plurality of subsystems in the form of programmable instructions executable by the one or more hardware processors.

The plurality of subsystems comprises a data receiving subsystem configured to receive one or more inputs from one or more second users. The one or more inputs comprise first information related to at least one of: one or more entities associated with the one or more first users, and a forecast period associated with a time duration during which the one of more second users are adapted to compute the future cash flow for the one or more entities associated with the one or more first users.

The plurality of subsystems further comprises a data extraction subsystem configured to extract one or more data associated with at least one of: one or more cash flow data of the one or more first users and second information associated with one or more third users, from one or more databases based on the one or more inputs received from the one or more second users. The cash flow data comprise at least one of: one or more historical cash flow data and one or more real-time cash flow data.

The plurality of subsystems further comprises a cluster feature generation subsystem configured to generate one or more features associated with the one or more third users based on the extracted one or more data associated with the one or more cash flow data of the one or more first users and the second information associated with one or more third users. The one or more features comprise at least one of: one or more frequency-based features, one or more distance-based features, and one or more seasonality-based features.

The plurality of subsystems further comprises a cluster generation subsystem configured to generate one or more clusters associated with the one or more third users of the one or more entities associated with the one or more first users based on the one or more features, using at least one machine learning model.

The plurality of subsystems further comprises a cash flow computing subsystem configured to: (a) determine the future cash flow for each cluster of the one or more clusters associated with the one or more third users; and (b) compute the future cash flow for the one or more clusters associated with the one or more third users by adding the future cash flow computed for each cluster of the one or more clusters associated with the one or more third users, for the one or more entities associated with the one or more first customers.

The plurality of subsystems further comprises an output subsystem configured to provide an output of the computed future cash flow for the one or more entities associated with the one or more first users, to the one or more second users on a user interface associated with one or more electronic devices.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
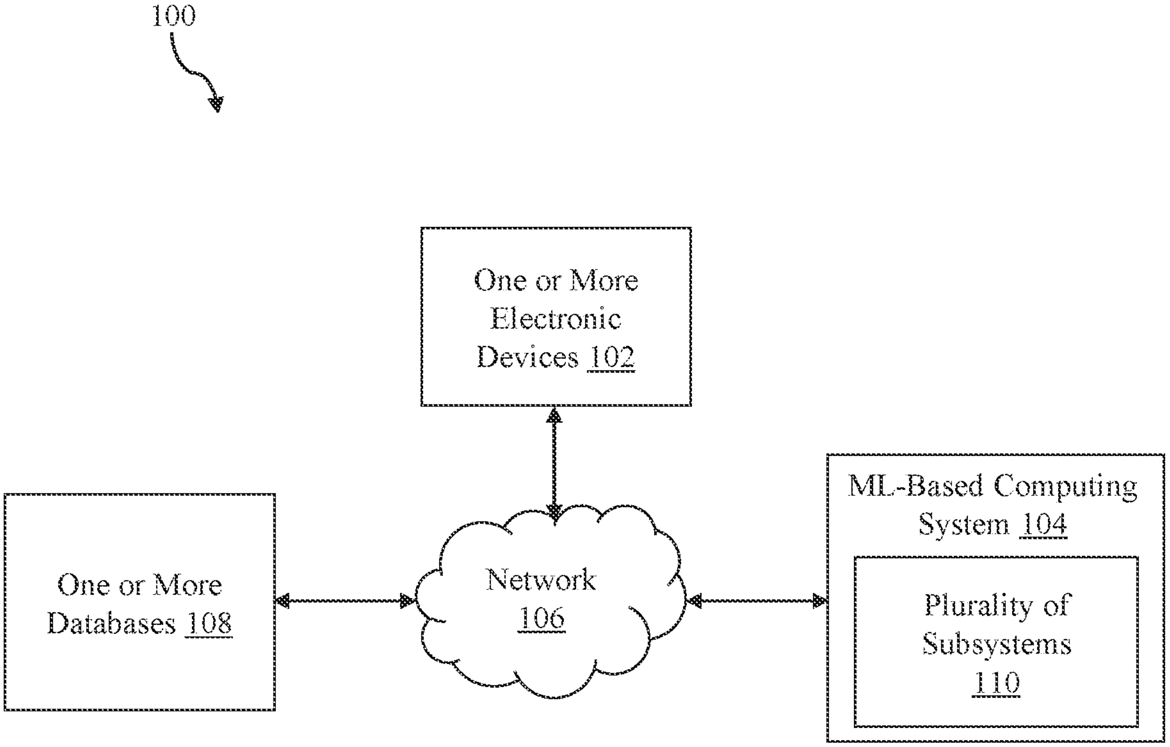
FIG. 1 is a block diagram illustrating a computing environment with a machine learning based (ML-based) computing system for computing future cash flow for one or more first users, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) computing system 104 for computing future cash flow for one or more first users, in accordance with an embodiment of the present disclosure. According to FIG. 1, the computing environment 100 includes one or more electronic devices 102 that are communicatively coupled to the ML-based computing system 104 through a network 106. The one or more electronic devices 102 through which one or more second users provide one or more inputs to the ML-based computing system 104. In an embodiment, the one or more first users may include at least one of: one or more organizations, one or more corporations, one or more parent companies, one or more subsidiaries, one or more joint ventures, one or more partnerships, one or more governmental bodies, one or more associations, one or more legal entities, and the like.

In an embodiment, the one or more second users may include at least one of: one or more data analysts, one or more business analysts, one or more cash analysts, one or more financial analysts, one or more collection analysts, one or more debt collectors, one or more professionals associated with cash and collection management, and the like.

The present invention is configured to compute the future cash flow for the one or more first users. The ML-based computing system 104 is initially configured to receive one or more inputs from the one or more second users. In an embodiment, the one or more inputs include first information related to at least one of: one or more entities associated with the one or more first users, and a forecast period associated with a time duration during which the one or more second users are adapted to compute the future cash flow for the one or more entities associated with the one or more first users.

The ML-based computing system 104 is further configured to extract one or more data associated with one or more cash flow data of the one or more first users and second information associated with one or more third users, from one or more databases 108 based on the one or more inputs received from the one or more second users. In an embodiment, the cash flow data include at least one of: one or more historical cash flow data and one or more real-time cash flow data. The ML-based computing system 104 is further configured to generate one or more features associated with the one or more third users based on the extracted one or more data associated with the one or more cash flow data of the one or more first users and the second information associated with one or more third users. In an embodiment, the one or more features comprise at least one of: one or more frequency-based features, one or more distance-based features, and one or more seasonality-based features.

The ML-based computing system 104 is further configured to generate one or more clusters associated with the one or more third users of the one or more entities associated with the one or more first users based on the one or more features, using at least one machine learning model. The ML-based computing system 104 is further configured to determine the future cash flow for each cluster of the one or more clusters associated with the one or more third users. The ML-based computing system 104 is further configured to compute the future cash flow the one or more clusters associated with the one or more third users by adding the future cash flow computed for each cluster of the one or more clusters associated with the one or more third users, for the one or more entities associated with the one or more first customers. The ML-based computing system 104 is further configured to provide an output of the computed future cash flow for the one or more entities associated with the one or more first users, to the one or more second users on a user interface associated with the one or more electronic devices 102.

The ML-based computing system 104 may be hosted on a central server including at least one of: a cloud server or a remote server. Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smartphone, a wearable device, a Smart watch, and the like.

Further, the computing environment 100 includes the one or more databases 108 communicatively coupled to the ML-based computing system 104 through the network 106. In an embodiment, the one or more databases 108 includes at least one of: one or more relational databases, one or more object-oriented databases, one or more data warehouses, one or more cloud-based databases, and the like. In another embodiment, a format of the one or more data generated from the one or more databases 108 may include at least one of: a comma-separated values (CSV) format, a JavaScript Object Notation (JSON) format, an Extensible Markup Language (XML), spreadsheets, and the like.

Furthermore, the one or more electronic devices 102 include at least one of: a local browser, a mobile application, and the like. Furthermore, the one or more second users may use a web application through the local browser, the mobile application to communicate with the ML-based computing system 104. In an embodiment of the present disclosure, the ML-based computing system 104 includes a plurality of subsystems 110. Details on the plurality of subsystems 110 have been elaborated in subsequent paragraphs of the present description with reference to FIG. 2.

Figure 2:
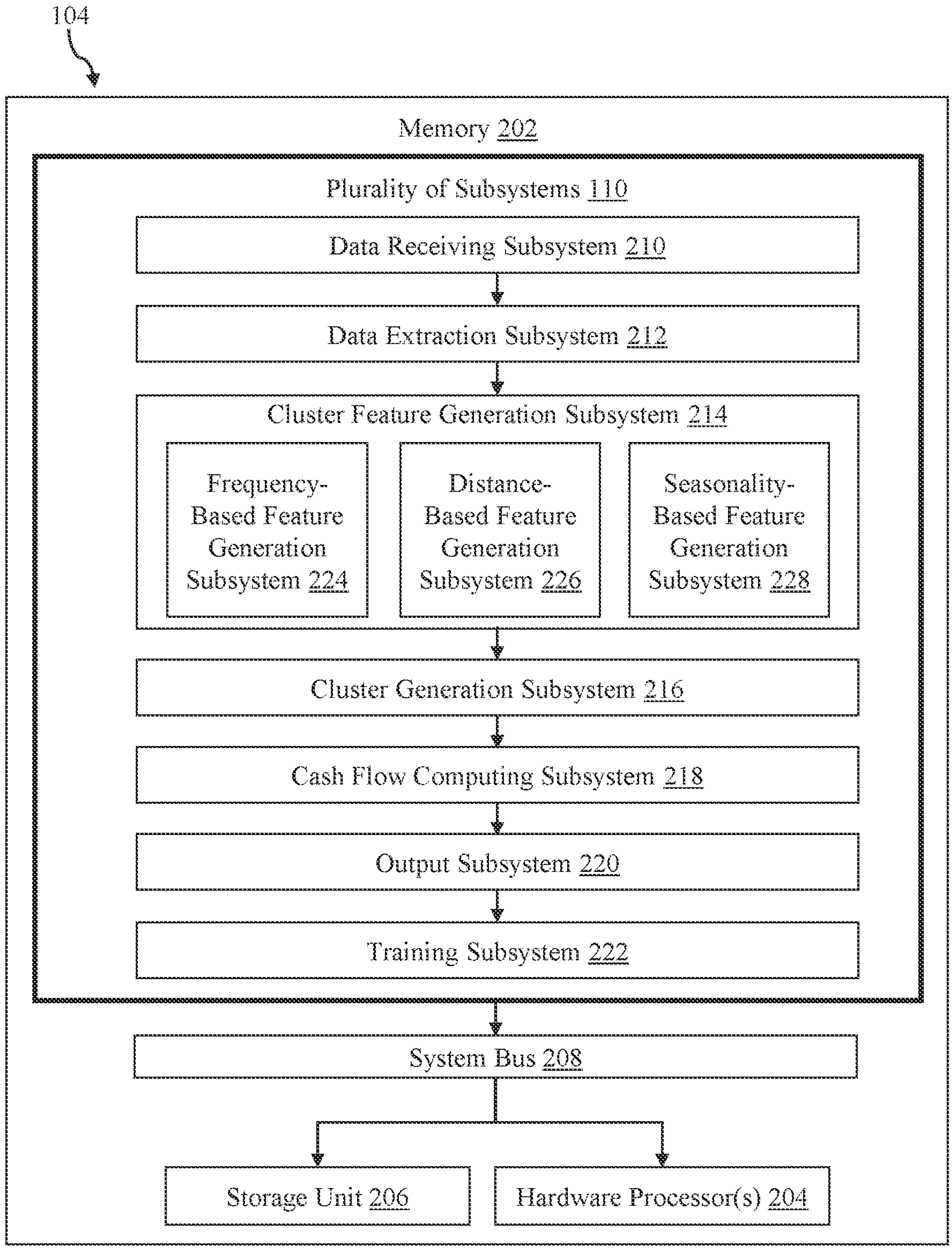
FIG. 2 is a detailed view of the ML-based computing system for computing the future cash flow for the one or more first users, in accordance with another embodiment of the present disclosure.

FIG. 2 is a detailed view of the ML-based computing system 104 for computing the future cash flow for the one or more first users, in accordance with another embodiment of the present disclosure. The ML-based computing system 104 includes a memory 202, one or more hardware processors 204, and a storage unit 206. The one or more hardware processors 204, the memory 202 and the storage unit 206 are communicatively coupled through a system bus 208 or any similar mechanism. The memory 202 includes the plurality of subsystems 110 in the form of programmable instructions executable by the one or more hardware processors 204.

The plurality of subsystems 110 includes a data receiving subsystem 210, a data extraction subsystem 212, a cluster feature generation subsystem 214, a cluster generation subsystem 216, a cash flow computing subsystem 218, an output subsystem 220, and a training subsystem 222. The cluster feature generation subsystem 214 includes a frequency-based feature generation subsystem 224, a distance-based feature generation subsystem 226, and a seasonality-based feature generation subsystem 228. The brief details of the plurality of subsystems 110 have been elaborated in a below table.

| Plurality of Subsystems 110 | Functionality |
|---|---|
| Data receiving subsystem 210 | The data receiving subsystem 210 is configured to receive the one or more inputs from the one or more second users. |
| Data extraction subsystem 212 | The data extraction subsystem 212 is configured to extract the one or more data associated with the one or more cash flow data of the one or more first users and the second information associated with the one or more third users, from the one or more databases 108 based on the one or more inputs received from the one or more second users. |
| Cluster feature generation subsystem 214 | The cluster feature generation subsystem 214 is configured to generate the one or more features associated with the one or more third users based on the extracted one or more data associated with the one or more cash flow data of the one or more first users and the second information associated with one or more third users. The one or more features include at least one of: the one or more frequency-based features, the one or more distance-based features, and the one or more seasonality - based features. |
| Cluster generation subsystem 216 | The cluster generation subsystem 216 is configured to generate the one or more clusters associated with the one or more third users of the one or more entities associated with the one or more first users based on the one or more features, using the at least one machine learning model. |

-continued

| Plurality of Subsystems 110 | Functionality |
|---|---|
| Cash flow computing subsystem 218 | The cash flow computing subsystem 218 is configured to determine the future cash flow for each cluster of the one or more clusters associated with the one or more third users and to compute the future cash flow the one or more clusters associated with the one or more third users by adding the future cash flow computed for each cluster of the one or more clusters associated with the one or more third users, for the one or more entities associated with the one or more first customers. |
| Output subsystem 220 | The output subsystem 220 is configured to provide the output of the computed future cash flow for the one or more entities associated with the one or more first users, to the one or more second users on the user interface associated with the one or more electronic devices 102. |
| Training subsystem 222 | The training subsystem 222 is configured to re-train/update the machine learning model over the plurality of time intervals based on one or more training data. |

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the data receiving subsystem 210 that is communicatively connected to the one or more hardware processors 204. The data receiving subsystem 210 is configured to receive the one or more inputs from the one or more second users. In an embodiment, the one or more inputs include the first information related to at least one of: the one or more entities associated with the one or more first users, and the forecast period associated with the time duration during which the one or more second users are adapted to compute the future cash flow for the one or more entities associated with the one or more first users.

For example, if the one or more second users want to compute the future cash flow for “ABC Corporation” between Dec. 1 and Dec. 31, 2023, then the one or more second users indicates “ABC Corporation” as the one or more entities and delineates the forecast/computed period as Dec. 1 to Dec. 31, 2023.

In an embodiment, the one or more first users may include at least one of: the one or more organizations, the one or more corporations, the one or more parent companies, the one or more subsidiaries, the one or more joint ventures, the one or more partnerships, the one or more governmental bodies, the one or more associations, the one or more legal entities, and the like. In an embodiment, the one or more second users may include at least one of: the one or more data analysts, the one or more business analysts, the one or more cash analysts, the one or more financial analysts, the one or more collection analysts, the one or more debt collectors, the one or more professionals associated with the cash and collection management, and the like.

The plurality of subsystems 110 further includes the data extraction subsystem 212 that is communicatively connected to the one or more hardware processors 204. The data extraction subsystem 212 is configured to extract the one or more data associated with at least one of: the one or more cash flow data of the one or more first users and the second information associated with the one or more third users, from the one or more databases 108 based on the one or more inputs received from the one or more second users. In an embodiment, the cash flow data include at least one of: the one or more historical cash flow data and the one or more real-time cash flow data.

In an embodiment, the one or more third users may include at least one of: one or more employees of the one or more first users, the one or more employees in each department, the one or more employees in each geographical location, the one or more employees in each hierarchy including a top level management with the one or more employees, a middle level management with the one or more employees, and one or more frontline employees. In an embodiment, the second information associated with the one or more third users may include at least one of: one or more identities associated with the one or more third users, one or more basic salaries, one or more allowances, one or more deductions, one or more overtime pays, one or more bonuses, one or more commissions, one or more benefits, one or more pay periods, one or more taxes, one or more net salaries, and the like.

In an embodiment, the one or more data are extracted from the one or more databases 108 based on one or more techniques including at least one of: data normalization, data anonymization, data aggregation, data analysis, data storage for future use, and the like. In an embodiment, the one or more databases 108 includes at least one of: the one or more relational databases, the one or more object-oriented databases, the one or more data warehouses, the one or more cloud-based databases, and the like. In another embodiment, the format of the one or more data generated from the one or more databases 108 may include at least one of: the comma-separated values (CSV) format, the JavaScript Object Notation (JSON) format, the Extensible Markup Language (XML), the spreadsheets, and the like The plurality of subsystems 110 further includes the cluster feature generation subsystem 214 that is communicatively connected to the one or more hardware processors 204. The cluster feature generation subsystem 214 is configured to generate the one or more features associated with the one or more third users based on the extracted one or more data associated with the one or more cash flow data of the one or more first users and the second information associated with one or more third users. In other words, the cluster feature generation subsystem 214 is configured to transform raw data (e.g., the one or more data) into one or more meaningful features that can be used as input for the at least one machine learning model. In an embodiment, the one or more features include at least one of: the one or more frequency-based features, the one or more distance-based features, and the one or more seasonality-based features.

The cluster feature generation subsystem 214 includes the frequency-based feature generation subsystem 224 that is communicatively connected to the one or more hardware processors 204. In other words, the frequency-based feature generation subsystem 224 is a subsystem of the contact feature score computing subsystem 214. The frequency-based feature generation subsystem 224 is configured to generate the one or more features based on frequency of transactions with respect to a particular employee (e.g., the one or more third users). The frequency-based feature generation subsystem 224 is configured to generate the one or more frequency-based features based on at least one of: first payment frequency (e.g., average payment frequency) and second payment frequency (e.g., the most frequent payment frequency), made to the one or more third users.

In an embodiment, the average payment frequency is an average payment gap between one or more payrolls of the one or more third users. In a non-limiting example, if the payroll date for five consecutive months is as given in below table 1, the average payment gap would be 30 days.

| Payroll Date | Payment Gap between payrolls |
|---|---|
| 15 Jan. 2023 | — |
| 13 Feb. 2023 | 30 days |
| 14 Mar. 2023 | 29 days |
| 13 Apr. 2023 | 30 days |
| 15 May 2023 | 31 days |

In one embodiment, the most frequent payment frequency is the most frequent payment day (e.g., a recurrent payment day) represents the most common day of the one or more months on which one or more historical payrolls are performed for a given employee (e.g., the one or more third users). The most frequent payment frequency is computed by computing a mode of the payment gaps between the payrolls. For example, in the above example, the most frequent payment frequency is 30 days, which is computed by calculating the mode of 30, 29, 30, 31, days.

The cluster feature generation subsystem 214 further includes the distance-based feature generation subsystem 226 that is communicatively connected to the one or more hardware processors 204. In other words, the distance-based feature generation subsystem 226 is a subsystem of the cluster feature generation subsystem 214. The distance-based feature generation subsystem 226 is configured to generate the one or more distance-based features based on at least one of: a distance from start of the one or more months and end of the one or more months, a distance from start of a quarter time period and end of the quarter time period, a distance from a predefined day of the one or more months (e.g., 15$^{th}$ of the one or more months), a distance from a last business day of the one or more months, and a distance from a last transaction.

In an embodiment, the feature "distance from start of the one or more months and end of the one or more months" is configured to indicate a temporal position of one or more payroll transactions within the one or more months. This feature is computed as a number of days between a payroll transaction date and a first day of the one or more months, as well as the number of days between the transaction date and the last day of the one or more months. In a non-limiting example, if a salary of the one or more third users is paid on July 12, the distance from the start of the one or more months would be 12 days, and the distance from the end of the one or more months would be 19 days.

In an embodiment, the feature "distance from start of the quarter time period and end of the quarter time period" is configured to indicate a temporal placement of the one or more payroll transactions within the quarter time period. The feature is computed as the number of days between the payroll transaction date and a first day of the quarter time period, along with the number of days between the payroll transaction date and a last day of the quarter time period. In a non-limiting example, if the one or more third users (e.g., the employee) receive their salary on April 25, the distance from the start of the quarter time period (e.g., April 1) would be 24 days, and the distance from the end of the quarter time period (e.g., June 30) would be 66 days.

In one embodiment, the feature "distance from a predefined day of the one or more months (e.g., 15$^{th}$ day of the one or more months)" is configured to compute the time difference between the payroll transaction date and the 15$^{th}$ day of the one or more months, serving as a mid-month reference point. In a non-limiting embodiment, if the salary of the employee is paid on March 20, the distance from the 15$^{th}$ of the one or more months would be 5 days.

In one embodiment, the feature "distance from the last business day of the one or more months" is configured to detect the temporal proximity of the one or more payroll transactions to the last business day of the one or more months. In a non-limiting example, the salary of the employee is paid on October 28, and October has 31 days, the distance from the last business day (e.g., October 31) would be 3 days. In one embodiment, the feature "distance from the last transaction" is configured to indicate the number of days between the current payroll transaction date and the date of the last payroll transaction. In a non-limiting example, if salary of the employee is paid on August 10, and the next salary payment occurs on August 25, the distance from the last transaction would be 15 days.

The cluster feature generation subsystem 214 further includes the seasonality-based feature generation subsystem 228 that is communicatively connected to the one or more hardware processors 204. In other words, the seasonality-based feature generation subsystem 228 is a subsystem of the cluster feature generation subsystem 214. The seasonality-based feature generation subsystem 228 is configured to generate, the one or more seasonality-based features based on at least one of: a mode of one or more days of the one or more months and the mode of one or more weekdays.

In one embodiment, the feature "mode of the one or more days of the one or more months" is configured to identify the most frequent payment day (e.g., a recurrent day) in a given month for a specific employee based on one or more historical payrolls. In a non-limiting example, if the one or more payrolls for the specific employee occurred on the $15^{th}$, $13^{th}$, $14^{th}$, $15^{th}$, and $15^{th}$, of five consecutive months, the most frequent payment day of the month would be the $15^{th}$. In another embodiment, the feature "mode of the one or more weekdays" is configured to determine the most common day of the week for the one or more payroll transactions while filtering out one or more noises caused by one or more anomalies including at least one of: holidays and bank issues. In a non-limiting example, if the one or more payrolls happened on Friday, Friday, Monday, Thursday, and Friday, of five consecutive months, the most frequent payment day of the week would be Friday.

The plurality of subsystems 110 further includes the cluster generation subsystem 216 that is communicatively connected to the one or more hardware processors 204. The cluster generation subsystem 216 is configured to dynamically generate the one or more clusters associated with the one or more third users of the one or more entities associated with the one or more first users based on the one or more features, using the at least one machine learning model. In an embodiment, the cluster generation subsystem 216 is configured to utilize a clustering based machine learning model to dynamically generate the one or more clusters associated with the one or more third users. The optimal cluster associated with the one or more third users is selected for forecasting/computing the future cash flow.

In an embodiment, the clustering based machine learning model may include at least one of: density-based spatial clustering of applications with noise (DBSCAN) model and a K-means clustering model. The generation of the one or more clusters associated with the one or more third users and computation of the future cash flow for the selected cluster, are not static processes. Specifically, the ML-based computing system 104 and method are configured to monitor the future cash flow data and the second information associated with the one or more third users (e.g., employee information) from the one or more databases 108 or information sources described herein to upgrade the at least one machine learning model as it evolves through a plurality of time intervals/periods.

The plurality of subsystems 110 further includes the training subsystem 222 that is communicatively connected to the one or more hardware processors 204. The training subsystem 222 is configured to train at least one machine learning model for generating the one or more clusters associated with the one or more third users. In an embodiment, the training subsystem 222 may be a part of the cluster generation subsystem 216. The training subsystem 222 is configured to receive one or more training datasets associated with the one or more features, from the cluster feature generation subsystem 214. The one or more features may include at least one of: the one or more frequency-based features, the one or more distance-based features, and the one or more seasonality-based features. In certain embodiments, the training subsystem 222 does not typically require labelled outputs for the training process. In alternative embodiments, the one or more input features may be appropriately mapped to the output of computed future cash flow data as an aid in the training process. In an embodiment, one or more datasets are shuffled and divided into the one or more training datasets and one or more validation datasets for training the at least one machine learning model.

In certain embodiments, the one or more input features are scaled or normalized to ensure stable training. In certain embodiments, the one or more anomalies are removed. In certain embodiments, at least one of: one or more outliers, one or more errors, and one or more mislabelled data, are removed or corrected to ensure that the one or more datasets are robust for training.

The training subsystem 222 is further configured to preprocess the one or more training datasets associated with the one or more features to convert/transform one or more numerical values of the one or more features to one or more common scale values, ensuring that their magnitudes do not unfairly influence the outcome of the cluster generation subsystem 216. The preprocessing of the one or more training datasets associated with the one or more features includes normalizing the one or more numerical values of the one or more features to one or more standardized ranges comprising zero and one, based on a normalization process. The preprocessing of the one or more training datasets associated with the one or more features further includes standardizing the one or more numerical values of the one or more features to obtain a mean value of zero and a standard deviation of one, based on a standardization process.

The normalization process is suitable when the one or more features have predefined ranges and are not susceptible to the one or more outliers, while the standardization process is more robust to the one or more outliers and well-suited for the one or more features with varying ranges. This process involves computing one or more scaling parameters, including at least one of: minimum and maximum values, and mean and standard deviation, from the one or more training datasets and then applying these parameters to the datasets. By performing the feature scaling, the distances between one or more data points become more meaningful and consistent, thereby enhancing the accuracy and stability of the cluster generation subsystem 216.

The at least one machine learning model include the density-based spatial clustering of applications with noise (DBSCAN) model. For training the density-based spatial clustering of applications with noise (DBSCAN) model, the training subsystem 222 is configured to receive the preprocessed one or more training datasets associated with the one or more features. The training subsystem 222 is further configured to select one or more first hyperparameters for training the density-based spatial clustering of applications with noise (DBSCAN) model. In an embodiment, the one or more first hyperparameters comprise at least one of: epsilon(s) hyperparameter and minimum samples hyperparameter. The epsilon hyperparameter indicating a radius (e.g., maximum radius) within which one or more first data points are indicated as one or more neighbors. The minimum samples hyperparameter is configured to generate one or more first dense regions by determining a predetermined number of the one or more first data points (e.g., minimum number of one or more first data points) required within the radius.

The training subsystem 222 is further configured to generate one or more first clustering models to automatically group the one or more third users including one or more analogical characteristics, based on the selected one or more first hyperparameters. In an embodiment, the one or more analogical characteristics associated with the one or more third users are useful for computing the future cash flow for the one or more first users. The training subsystem 222 is further configured to scan the grouped one or more third users including the one or more analogical characteristics, with the one or more first data points to identify at least one of: the one or more first dense regions as the one or more clusters and one or more isolated first data points as the one or more noises. The training subsystem 222 is further configured to compute one or more pairwise distances between the one or more first data points during the training process.

The training subsystem 222 is further configured to determine whether the one or more first data points satisfy a predetermined criteria of the one or more first hyperparameters. In other words, the training subsystem 222 is further configured to determine whether the one or more first data points fall within the specified epsilon radius and meet the minimum samples criterion. The training subsystem 222 is further configured to classify the one or more first data points as at least one of: (a) one or more first core data points indicating the one or more clusters (e.g., nucleus of the one or more clusters) when the one or more first data points meet the criteria, one or more first border data points when the one or more first data points are reachable from the one or more first core data points but do not meet the density criteria, and one or more first noise data points indicating the one or more noises when the one or more first data points are not reachable from the one or more first core data points.

In an embodiment, as the algorithm progresses, the one or more clusters expand, and the one or more first data points are assigned to the appropriate one or more clusters. The training process continues until the one or more first data points are assigned to the one or more clusters or labelled as the one or more noises. The outcome is a trained density-based spatial clustering of applications with noise (DBSCAN) model capable of efficiently capturing the one or more clusters associated with the one or more third users. In certain embodiments, the training subsystem 222 is configured to validate and tune the density-based spatial clustering of applications with noise (DBSCAN) model in the cluster generation subsystem 216. The evaluation and tuning of the density-based spatial clustering of applications with noise (DBSCAN) model involves assessing the quality of the generated clusters and iteratively improving the results if necessary. In certain embodiments, the tuning of the one or more first hyperparameters is performed to determine the optimal combination of hyperparameter values that yields the best employee cluster results.

Since the density-based spatial clustering of applications with noise (DBSCAN) model does not require ground truth labels, evaluation is often performed using internal clustering metrics including at least one of: silhouette score computing a separation between the one or more clusters, and Davies-Bouldin index quantifying cluster dispersion. These clustering metrics provide insights into the compactness and separation of the one or more clusters. In certain embodiment, to fine-tune the density-based spatial clustering of applications with noise (DBSCAN) model in the cluster generation subsystem 216, in the training phase, the future cash flow is forecasted for the one or more clusters generated by the cluster generation subsystem 216. Thereafter, the future cash flow forecasted for the one or more clusters are compared to the one or more historical cash flow data. The one or more features associated with the one or more third users and the one or more first hyperparameters combination for the one or more clusters associated with the one or more third users, which shows that highest accuracy and lowest volatility is selected for employee clustering in future cycles of the cluster generation subsystem 216.

The training subsystem 222 is further configured to validate the density-based spatial clustering of applications with noise (DBSCAN) model based on the one or more validation datasets. For validating the density-based spatial clustering of applications with noise (DBSCAN) model, the training subsystem 222 is configured to determine whether one or more first results of the one or more clusters associated with the one or more third users satisfy one or more first predetermined threshold results. The training subsystem 222 is further configured to perform one or more first processes comprising at least one of: preprocessing of the one or more training datasets associated with the one or more features, adjusting of the one or more features, and adjusting of the one or more first hyperparameters, until the one or more first results of the one or more clusters associated with the one or more third users satisfy the one or more first predetermined threshold results. In an embodiment, iterative refinement of the one or more first processes ensures that the cluster generation subsystem 216 aligns more closely with the true distribution of the data.

Further, at least one machine learning model includes the K-means clustering model. For training the K-means clustering model, the training subsystem 222 is configured to receive the pre-processed one or more training datasets associated with the one or more features. The training subsystem 222 is further configured to select one or more second hyperparameters for training the K-means clustering model. In an embodiment, the one or more second hyperparameters may include at least one of: one or more number of clusters hyperparameter (k-value), one or more cluster initialization hyperparameters (to determine how the initial centroids for clusters are selected), maximum number of iterations hyperparameter, one or more relative tolerance hyperparameters, one or more distance metrics (metric used to measure the distance between data points and cluster centroids), one or more verbose hyperparameters, and one or more random state hyperparameters.

The number of clusters hyperparameter is configured to specify the number of clusters to form as well as the number of centroids to generate, which can be chosen by using different methods, such as the elbow method. The one or more cluster initialization hyperparameters specify the method for initialization of the cluster centroids, such as 'random' or 'k-means++', which affects the speed and quality of convergence. The maximum number of iterations hyperparameter defines the maximum number of iterations allowed for each run of the k-means algorithm, which prevents overfitting by stopping when no further improvement is observed.

The one or more relative tolerance hyperparameters specify the relative tolerance with regards to Frobenius norm of the difference in the cluster centers between two consecutive iterations, which defines when to declare convergence based on how much error is allowed. The one or more distance metrics (metric used to measure the distance between data points and cluster centroids) The one or more verbose hyperparameters specify the verbosity mode, which controls how much information is printed during each iteration, such as the current iteration number, the WCSS (Within Cluster Sum of Squares) or BCSS (Between Cluster Sum of Squares) value, and the time elapsed. The one or more random state hyperparameters specify the random state instance or none, which determines random number generation for centroid initialization, which allows reproducibility by setting a fixed seed for generating random numbers.

The training subsystem 222 is further configured to assign one or more data points in the one or more training datasets to the closest centroid to automatically group the one or more third users including one or more analogical characteristics, based on the selected one or more second hyperparameters. The training subsystem 222 is further configured to re-compute the centroids of each cluster by determining an average of the one or more data points in the one or more clusters.

The training subsystem 222 is further configured to repeat the assignment of the one or more data points and re-computation of centroids steps until the centroids remain unchanged significantly. The training subsystem 222 is further configured to classify the one or more data points as the one or more clusters associated with the one or more third users. The performance metrics including at least one of: silhouette score computing a separation between the one or more clusters, and Davies-Bouldin index quantifying cluster dispersion, are computed to assess the clustering quality. The evaluation and tuning of the K-means clustering model involves assessing the quality of the generated clusters and iteratively improving the results if necessary. In certain embodiments, the tuning of the one or more second hyperparameters is performed to determine the optimal combination of hyperparameter values that yields the best employee cluster results.

In certain embodiments, the K-means clustering model is evaluated by at least one of: a grid search and a random search, to explore different combinations of hyperparameter values. This involves training and evaluating the K-means clustering model with one or more settings to identify the configuration that yields the best clustering results. The iterative process of refining the one or more second hyperparameters and assessing K-means clustering model's performance continues until an optimal configuration is reached. This trained K-means clustering model can then be deployed to generate distinct employee clusters based on the provided features. In certain embodiment, to fine-tune the K-means clustering model in the cluster generation subsystem 216, in the training phase, the future cash flow is forecasted for one or more clusters generated by the cluster generation subsystem 216. Thereafter, the future cash flow forecasted for the one or more clusters are compared to the one or more historical cash flow data. The one or more features associated with the one or more third users and the one or more second hyperparameters combination for the one or more clusters associated with the one or more third users, which shows that highest accuracy and lowest volatility is selected for employee clustering in future cycles of the cluster generation subsystem 216.

The training subsystem 222 is further configured to validate the K-means clustering model based on the one or more validation datasets. For validating the K-means clustering model, the training subsystem 222 is configured to determine whether one or more second results of the one or more clusters associated with the one or more third users satisfy one or more second predetermined threshold results. The training subsystem 222 is further configured to perform one or more second processes including at least one of; preprocessing of the one or more training datasets associated with the one or more features, adjusting of the one or more features, and adjusting of the one or more second hyperparameters, until the one or more second results of the one or more clusters associated with the one or more third users satisfy the one or more second predetermined threshold results. In an embodiment, iterative refinement of the one or more second processes ensures that the cluster generation subsystem 216 aligns more closely with the true distribution of the data.

The plurality of subsystems 110 further includes the cash flow computing subsystem 218 that is communicatively connected to the one or more hardware processors 204. The cash flow computing subsystem 218 is configured to determine the future cash flow for each cluster of the one or more clusters associated with the one or more third users. In a non-limiting embodiment, for computing/forecasting the future cash flow, the cash flow computing subsystem 218 is configured to utilize the ML-based computing system and method disclosed in U.S. patent application Ser. No. 18/474,429, which is incorporated by reference.

In another non-limiting embodiment, for forecasting the future cash flow for the one or more first users (e.g., professional employer organizations (PEOs)), the cash flow computing subsystem 218 is configured to utilize alternative forecasting models including at least one of: a rolling average method, an ARIMA prediction model and a prophet prediction models.

The cash flow computing subsystem 218 is further configured to compute the future cash flow for the one or more clusters associated with the one or more third users by adding the future cash flow determined for each cluster of the one or more clusters associated with the one or more third users, for the one or more entities associated with the one or more first customers. In a non-limiting example, for a customer entity "ABC Corporation", the cash flow computing subsystem 218 is configured to compute the projected future cash flow for each employee cluster individually. For instance, cluster A's forecast may be $5 million, cluster B's forecast may be $2.5 million, and cluster C's forecast may be $3 million. These individual forecasts are then summed up, resulting in a total future cash flow forecast of $10.5 million for the entire "ABC Corporation", during the forecast period.

The plurality of subsystems 110 further includes the output subsystem 220 that is communicatively connected to the one or more hardware processors 204. The output subsystem 220 is configured to provide the output of the computed future cash flow for the one or more entities associated with the one or more first users, to the one or more second users on the user interface associated with the one or more electronic devices 102. In certain embodiments, the output subsystem 220 may convert numerical future cash flow forecast data into at least one of: one or more visual forms, including at least one of: one or more bar graphs, one or more line charts, one or more pie charts, one or more scatter plots, one or more heatmaps, and the like. In certain embodiments, the output subsystem 220 is configured to provide a choice of visualization depending on the data's nature and one or more insights sought. In an embodiment, one or more interactive features can be added to allow the one or more second users to explore the one or more data dynamically. Additionally, considerations including at least one of: color coding, legends, and annotations, enhance the clarity of the visual representation.

In an embodiment, the training subsystem 222 is configured to re-train at least one machine learning model over a plurality of time intervals based on one or more training data. For re-training the at least one machine learning model over the plurality of time intervals, the training subsystem 222 is configured to receive the one or more training data associated with third information associated with the one or more third users, from the output subsystem 220. The training subsystem 222 is further configured to add the one or more training data with the one or more original training datasets including the second information associated with the one or more third users to generate one or more updated training datasets. In an embodiment, the one or more updated training datasets may include one or more old data points and one or more new data points. The training subsystem 222 is further configured to re-train at least one machine learning model to update one or more training configurations of the cluster generation subsystem 216. The training subsystem 222 is further configured to execute the at least one re-trained machine learning model in the cluster generation subsystem 216 to generate the one or more clusters associated with the one or more third users.

Subsequently, the same training process including continuous evaluation and tuning, is followed to assess the quality of the one or more generated clusters and iteratively improving the results if necessary. The steps are repeated for a fixed number of iterations until the one or more third users (e.g., one or more employees) are appropriately assigned to the one or more clusters or labelled as the one or more noises as per a pre-set threshold criteria. Thereafter, the changes are implemented to the cluster generation subsystem 216, and new clustering takes place with the updated cluster generation subsystem 216.

Figure 3:
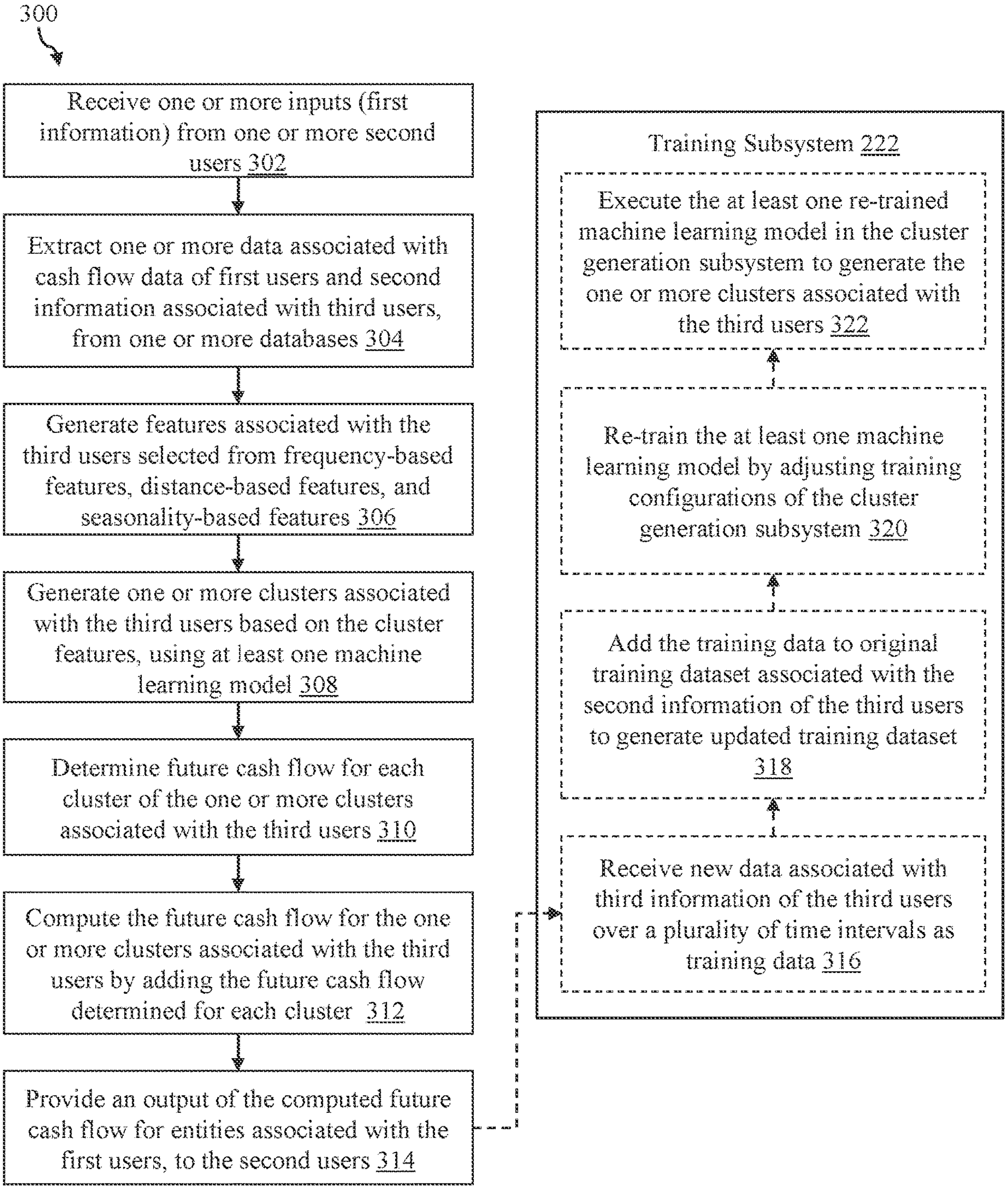
FIG. 3 is an overall process flow of computing the future cash flow for the one or more first users, in accordance with another embodiment of the present disclosure.

FIG. 3 is an overall process flow 300 of computing the future cash flow for the one or more first users, in accordance with another embodiment of the present disclosure. At step 302, the one or more inputs are received from the one or more second users. The one or more inputs include the first information related to at least one of: the one or more entities associated with the one or more first users, and the forecast period associated with the time duration during which the one or more second users are adapted to compute the future cash flow for the one or more entities associated with the one or more first users.

At step 304, the one or more data associated with at least one of: one or more cash flow data of the one or more first users and second information associated with one or more third users, are extracted from the one or more databases 108 based on the one or more inputs received from the one or more second users. In an embodiment, the cash flow data include at least one of: the one or more historical cash flow data and the one or more real-time cash flow data.

At step 306, the one or more features associated with the one or more third users are generated based on the extracted one or more data associated with the one or more cash flow data of the one or more first users and the second information associated with the one or more third users. In an embodiment, the one or more features comprise at least one of: one or more frequency-based features, one or more distance-based features, and one or more seasonality-based features.

At step 308, the one or more clusters associated with the one or more third users of the one or more entities associated with the one or more first users, are generated based on the one or more features, using the at least one machine learning model. At step 310, the future cash flow is determined for each cluster of the one or more clusters associated with the one or more third users.

At step 312, the future cash flow for the one or more clusters associated with the one or more third users, is computed by adding the future cash flow computed for each cluster of the one or more clusters associated with the one or more third users, for the one or more entities associated with the one or more first customers. At step 314, the output of the computed future cash flow for the one or more entities associated with the one or more first users, to the one or more second users on the user interface associated with the one or more electronic devices 102.

At step 316, the one or more training data associated with third information associated with the one or more third users, are received from the output subsystem 220. At step 318, the one or more training data are added to the one or more original training datasets including the second information associated with the one or more third users (e.g., new employee information) to generate one or more updated training datasets. At step 320, the at least one machine learning model is re-trained/updated to update the one or more configurations/parameters of the cluster generation subsystem 216. At step 322, the re-trained/updated machine learning model is executed in the cluster generation subsystem 216 to generate the one or more clusters associated with the one or more third users.

Figure 4A:
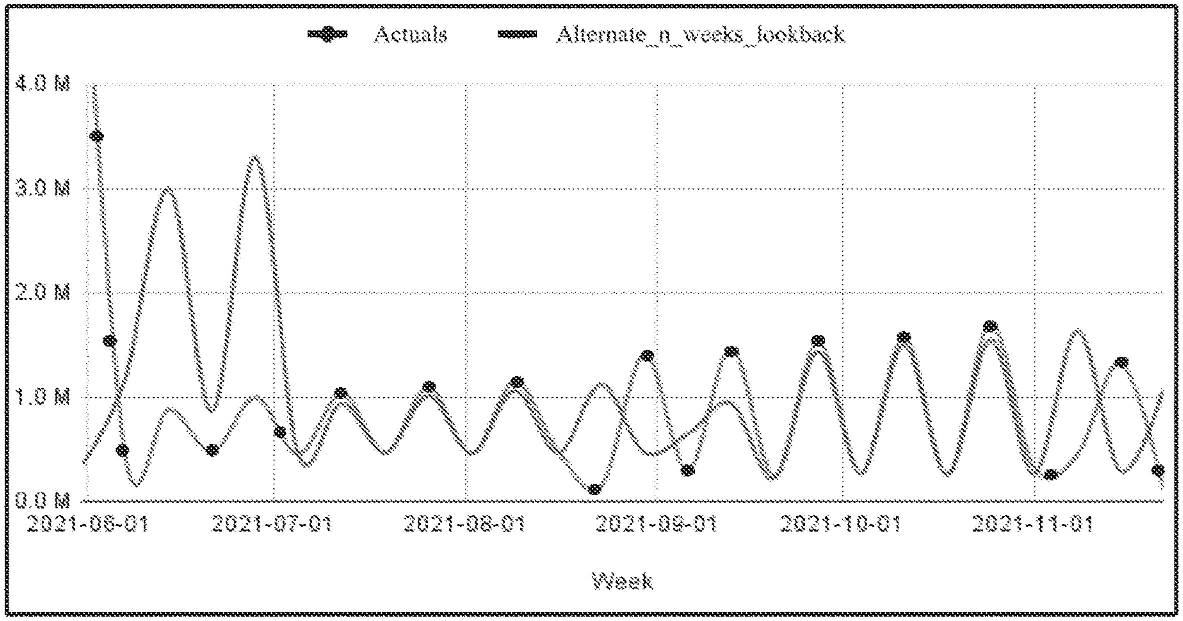
FIGS. 4A-4D are exemplary graphical representations depicting benchmarking and accuracy comparison of the ML-based computing system with existing approaches including an alternate weeks look back approach, a simple rolling average approach, and a week of year average approach for computing the future cash flow data for the one or more first users, in accordance with an embodiment of the present disclosure.
Figure 4B:
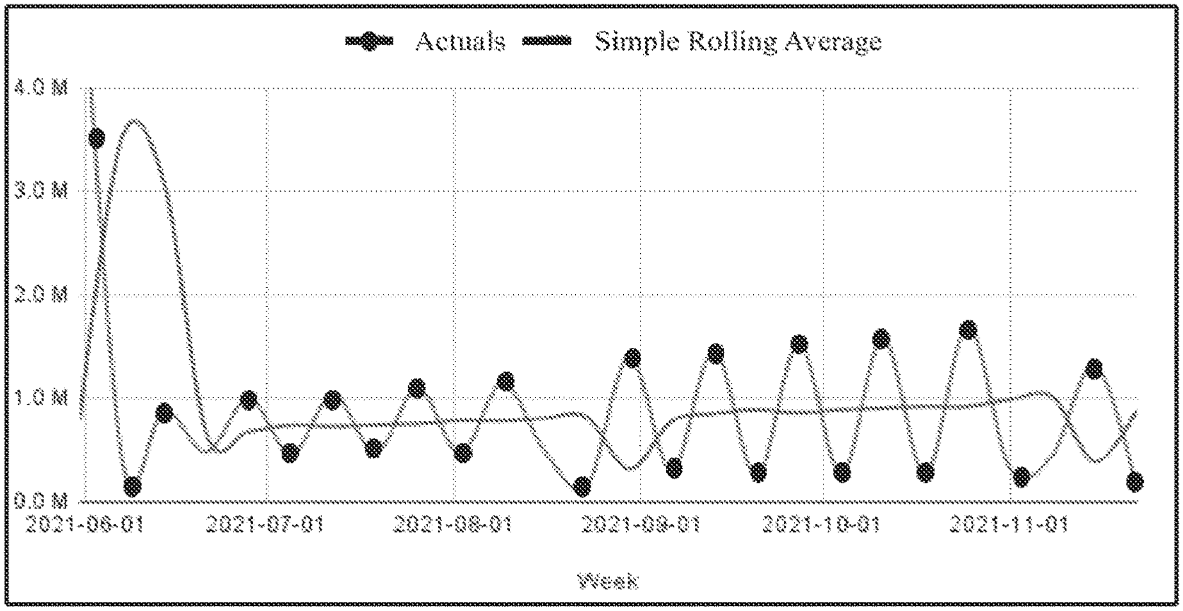
Figure 4C:
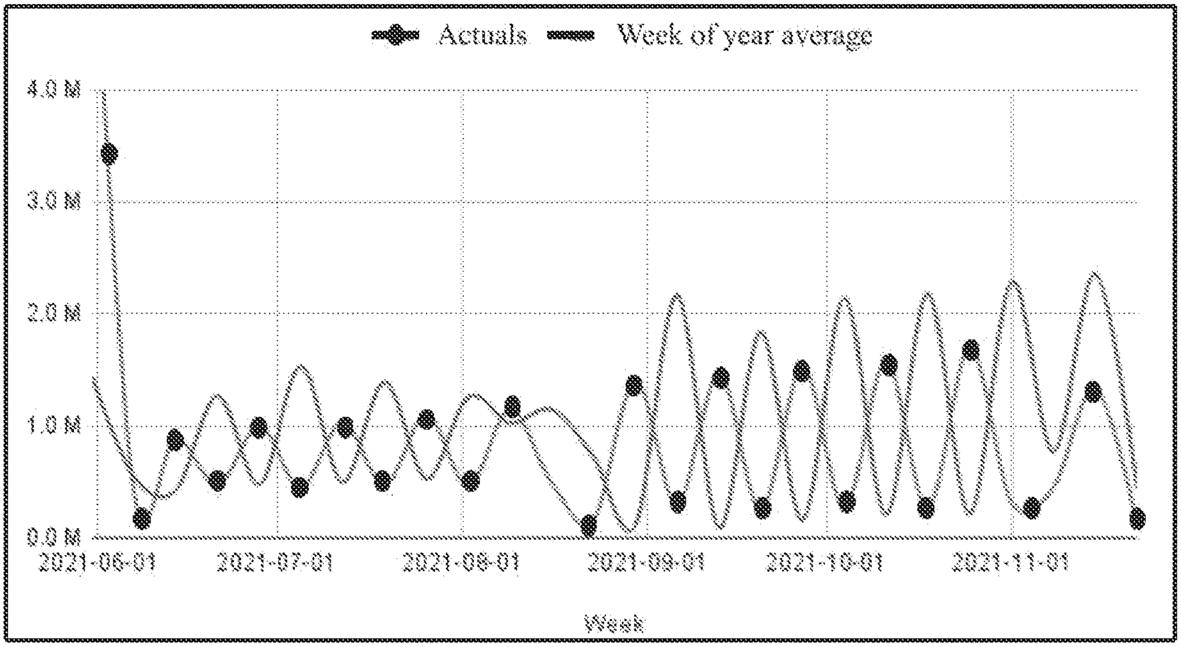
Figure 4D:
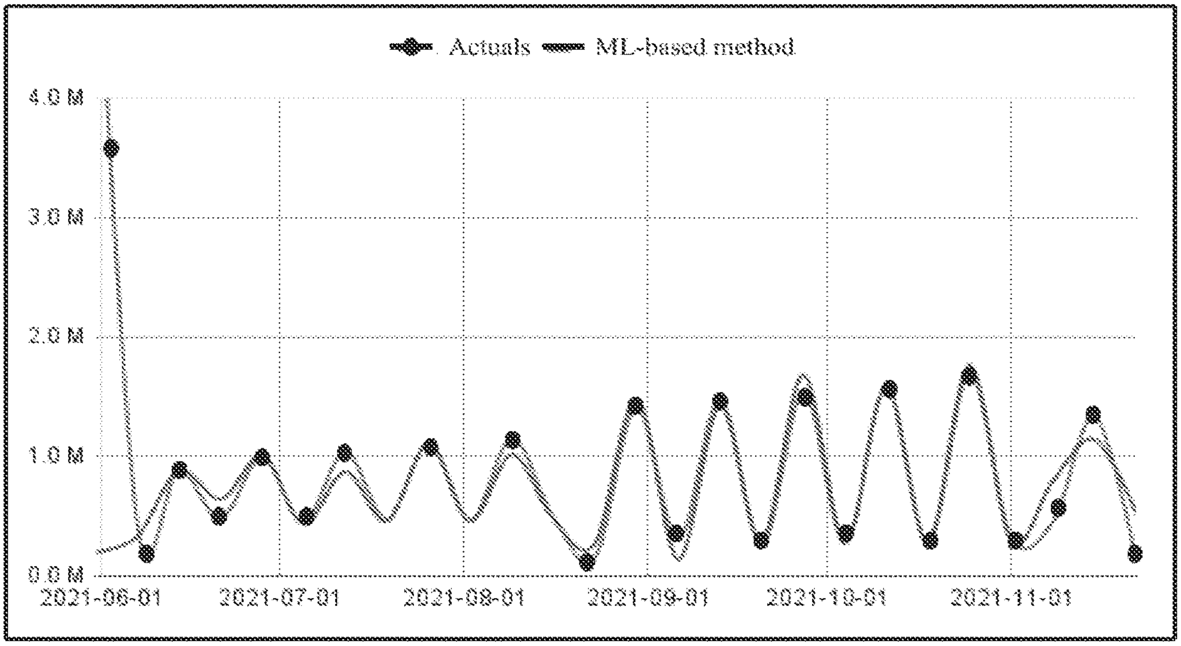

FIGS. 4A-4D are exemplary graphical representations 400 depicting benchmarking and accuracy comparison of a ML-based computing and method (as shown in FIG. 4D) with existing approaches including an alternate weeks look back approach (as shown in FIG. 4A), a simple rolling average approach (as shown in FIG. 4B), and a week of year average approach (as shown in FIG. 4C) for computing the future cash flow data for the one or more first users, in accordance with an embodiment of the present disclosure. A below table depicting the accuracy comparison and benchmarking of the ML-based computing method with existing approaches including the alternate weeks look back approach, the simple rolling average approach, and the week of year average approach, is given below.

| Horizon | Rolling Average | Alternate Week Lookback | Week Of Year Average | ML-based computing method |
|---|---|---|---|---|
| Week 1 | 42% | 35% | 24% | 69% |
| Week 1-4 | 60% | 58% | 67% | 85% |
| Week 1-13 | 55% | 53% | 74% | 89% |

In the above accuracy comparison, week 1 refers to a forecast over a 1-week horizon, similarly week 1-4 refers to a 28-day horizon forecast and week 1-13 refers to a 91-day or approximately a Quarter horizon forecast. Short-terms (e.g., week 1 and week 1-4) accuracies are better because the employee-level forecasting method is used which forecasts on the basis of the employee pay cycle. On a longer horizon (e.g., week 1-13) customer-level forecast is followed which takes the growth rate into account of each vendor.

A below table depicting error comparison of the ML-based computing method with existing approaches including the alternate weeks look back approach, the simple rolling average approach, and the week of year average approach, is given below.

| Horizon | Rolling Average | | Alternate Week Lookback | | Week Of Year Average | | ML-based computing method | |
|---|---|---|---|---|---|---|---|---|
| | 90th % tile error | 75th % tile error | 90th % tile error | 75th % tile error | 90th % tile error | 75th % tile error | 90th % tile error | 75th % tile error |
| Week 1 | 104% | 74% | 118% | 67% | 891% | 243% | 47% | 17% |
| Week 1-4 | 42% | 35% | 49% | 34% | 44% | 24% | 13% | 7% |
| Week 1-13 | 46% | 40% | 56% | 48% | 27% | 24% | 11% | 6% |

The above table shows the comparison of error volatility for the various forecasting methods. The ML-based computing system 104 and method has low volatility as compared to the existing forecast approaches in the short-terms (e.g., week 1 and week 1-4), as well as the long term (e.g., week 1-13).

Figure 5:
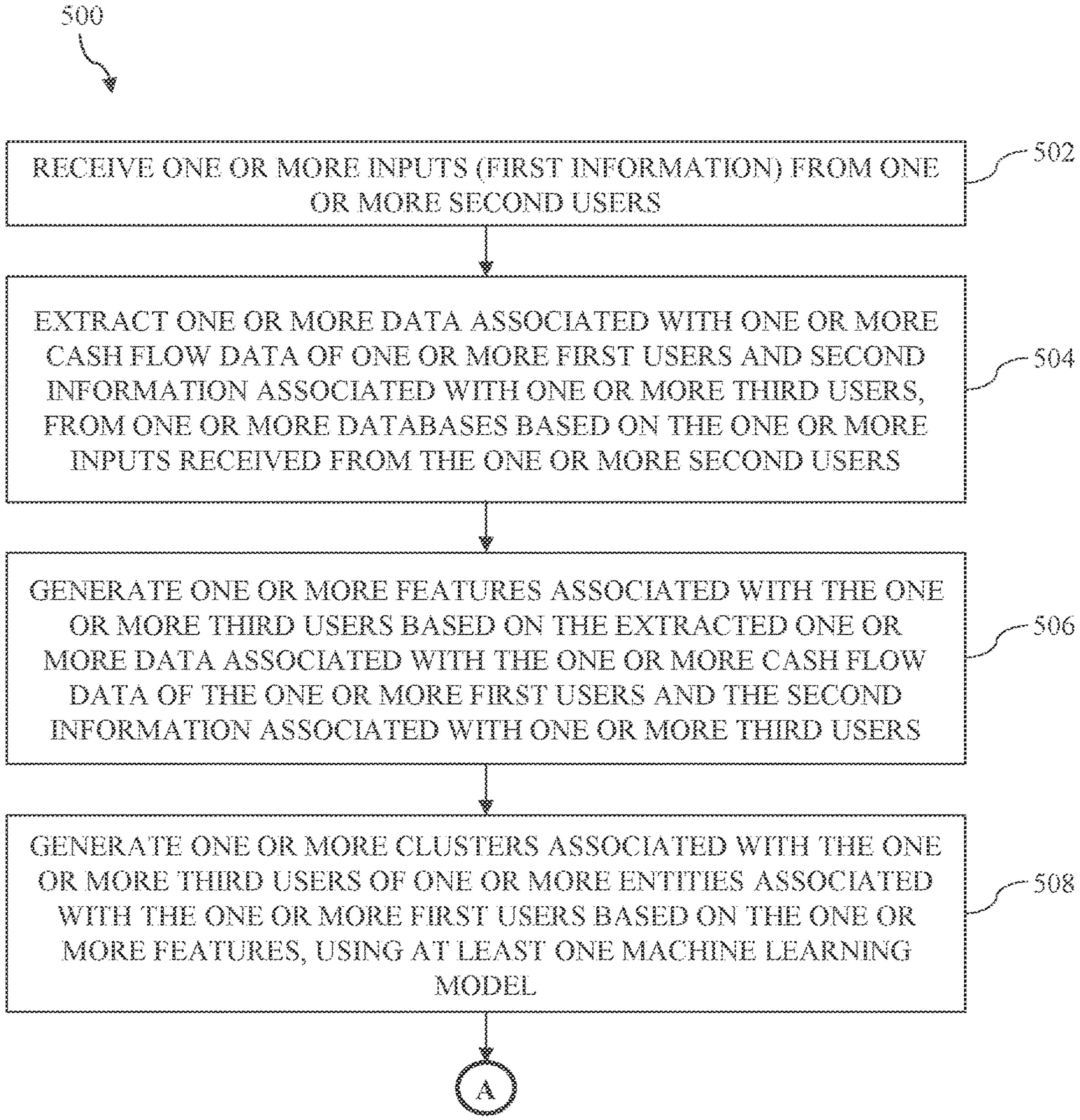
FIG. 5 is a flow chart illustrating a machine-learning based (ML-based) computing method for computing the future cash flow for the one or more first users, in accordance with an embodiment of the present disclosure.
Figure 5:
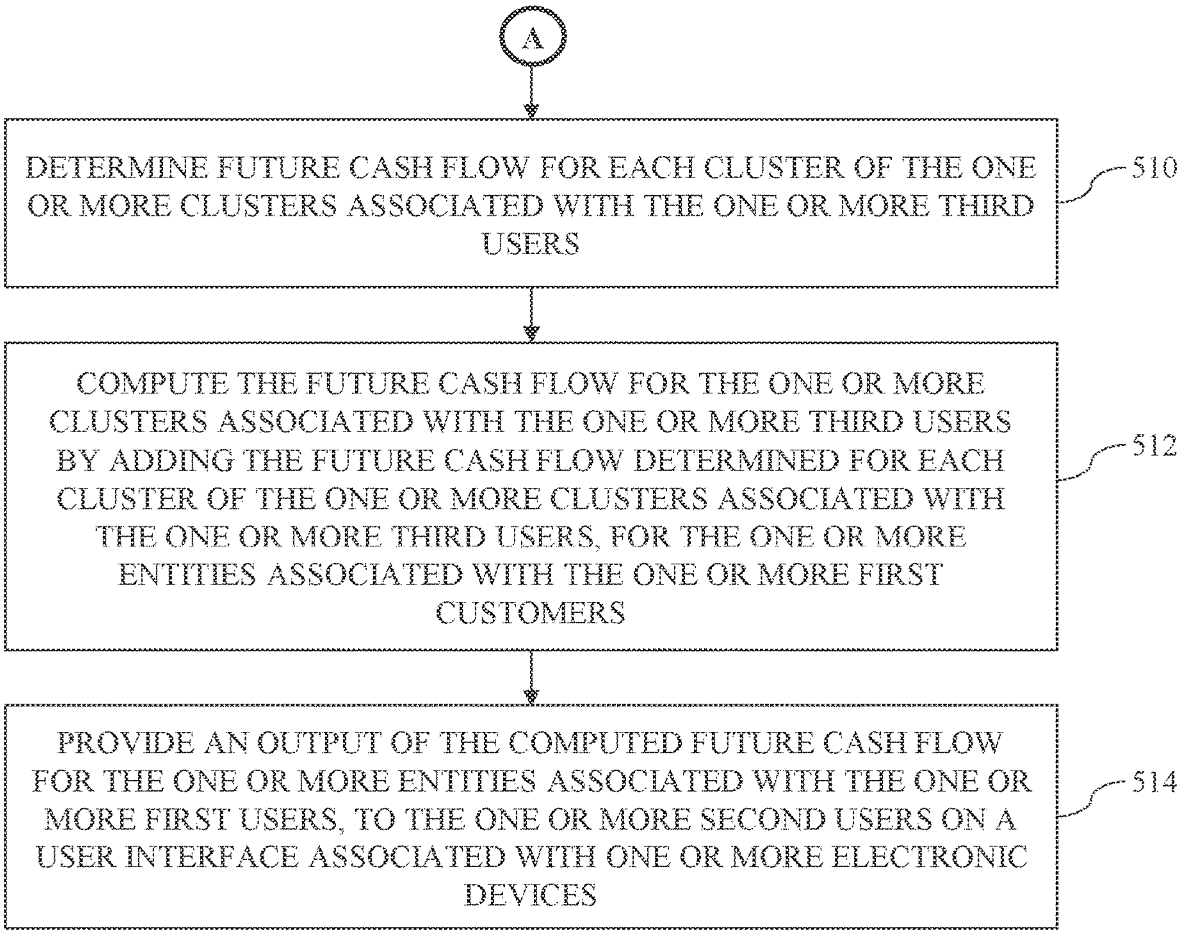

FIG. 5 is a flow chart illustrating a machine-learning based (ML-based) computing method 500 for computing the future cash flow for the one or more first users, in accordance with an embodiment of the present disclosure.

At step 502, the one or more inputs are received from the one or more second users. The one or more inputs include the first information related to at least one of: the one or more entities associated with the one or more first users, and the forecast period associated with the time duration during which the one or more second users are adapted to compute the future cash flow for the one or more entities associated with the one or more first users.

At step 504, the one or more data associated with at least one of: one or more cash flow data of the one or more first users and second information associated with one or more third users, are extracted from the one or more databases 108 based on the one or more inputs received from the one or more second users. In an embodiment, the cash flow data include at least one of: the one or more historical cash flow data and the one or more real-time cash flow data.

At step 506, the one or more features associated with the one or more third users are generated based on the extracted one or more data associated with the one or more cash flow data of the one or more first users and the second information associated with the one or more third users. In an embodiment, the one or more features comprise at least one of: one or more frequency-based features, one or more distance-based features, and one or more seasonality-based features.

At step 508, the one or more clusters associated with the one or more third users of the one or more entities associated with the one or more first users, are generated based on the one or more features, using the at least one machine learning model. At step 510, the future cash flow is determined for each cluster of the one or more clusters associated with the one or more third users.

At step 512, the future cash flow for the one or more clusters associated with the one or more third users, is computed by adding the future cash flow computed for each cluster of the one or more clusters associated with the one or more third users, for the one or more entities associated with the one or more first customers. At step 514, the output of the computed future cash flow for the one or more entities associated with the one or more first users, to the one or more second users on the user interface associated with the one or more electronic devices 102. In FIG. 5, the circular symbol with "A" written inside is being used as an off-page connector. This is used for indicating that FIG. 5 continues in the next page.

The present invention has the following advantages. The present invention with the ML-based computing system 104 is configured to compute the future cash flow for the one or more first users. The ML-based computing system 104 and the ML-based computing method 500 aim at computing the accurate future cash flow for the one or more first users to avoid cash shortages. The present invention with the ML-based computing system 104 is configured to compute the accurate future cash flow even though the one or more first users have a unique cash flow cycle for the one or more third users.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the ML-based computing system 104 either directly or through intervening I/O controllers. Network adapters may also be coupled to the ML-based computing system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/ML-based computing system 104 in accordance with the embodiments herein. The ML-based computing system 104 herein comprises at least one processor or central processing unit (CPU). The CPUs are interconnected via system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the ML-based computing system 104. The ML-based computing system 104 can read the inventive instructions on the program storage devices and follow these instructions to execute the methodology of the embodiments herein.

The ML-based computing system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising." "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine-learning based (ML-based) computing method for computing future cash flow for one or more first users, the ML-based computing method comprising:

receiving, by one or more hardware processors, one or more inputs from one or more second users, wherein the one or more inputs comprise first information related to at least one of: one or more entities associated with the one or more first users, and a forecast period associated with a time duration during which the one or more second users are adapted to compute the future cash flow for the one or more entities associated with the one or more first users;

extracting, by the one or more hardware processors, one or more data associated with at least one of: one or more cash flow data of the one or more first users and second information associated with one or more third users, from one or more databases based on the one or more inputs received from the one or more second users, wherein the cash flow data comprise at least one of: one or more historical cash flow data and one or more real-time cash flow data;

generating, by the one or more hardware processors, one or more features associated with the one or more third users based on the extracted one or more data associated with the one or more cash flow data of the one or more first users and the second information associated with the one or more third users, by;

generating, by the one or more hardware processors, one or more frequency-based features based on at least one of: first payment frequency and second payment frequency, made to the one or more third users, wherein the first payment frequency is an average payment gap between one or more payrolls of the one or more third users, and wherein the second payment frequency is a recurrent payment day indicating a common day of one or more months on which one or more historical payrolls are performed for the one or more third users;

generating, by the one or more hardware processors, one or more distance-based features based on at least one of: a distance from start of the one or more months and end of the one or more months, a distance from start of a quarter time period and end of the quarter time period, a distance from a predefined day of the one or more months, a distance from a last business day of the one or more months, and a distance from a last transaction; and generating, by the one or more hardware processors, one or more seasonality-based features based on at least one of: a mode of one or more days of the one or more months and the mode of one or more weekdays, wherein the mode of one or more days of the one or more months is configured to identify a recurrent day in the one or more months for the one or more third users based on the one or more historical payrolls; and wherein the mode of the one or more weekdays is configured to determine the recurrent day of one or more weeks for one or more payroll transactions by filtering one or more noises comprising at least one of: one or more holidays and one or more bank issues;

training, by the one or more hardware processors, at least one machine learning model, by:

receiving, by the one or more hardware processors, one or more training datasets associated with the one or more features, from a cluster feature generation subsystem; and pre-processing, by the one or more hardware processors, the one or more training datasets associated with the one or more features to convert one or more numerical values of the one or more features to one or more common scale values by at least one of:

normalizing, by the one or more hardware processors, the one or more numerical values of the one or more features to one or more standardized ranges comprising zero and one; and standardizing, by the one or more hardware processors, the one or more numerical values of the one or more features to obtain a mean value of zero and a standard deviation of one;

generating, by the one or more hardware processors, one or more clusters associated with the one or more third users of the one or more entities associated with the one or more first users based on the one or more features, using the at least one machine learning model, wherein the machine learning model comprises at least one of a density-based spatial clustering of applications with noise (DBSCAN) model and a K-means clustering model;

wherein the DBSCAN model is trained by one or more first hyperparameters comprising an epsilon hyperparameter and a minimum sample hyperparameter;

wherein the DBSCAN model is trained by:

receiving, by the one or more hardware processors, the pre-processed one or more training datasets associated with the one or more features;

selecting, by the one or more hardware processors, the one or more first hyperparameters for training the DBSCAN model, wherein the epsilon hyperparameter indicates a radius within which one or more first data points are indicated as one or more neighbors, and wherein the minimum sample hyperparameter is configured to generate one or more first dense regions by determining a predetermined number of the one or more first data points required within the radius;

generating, by the one or more hardware processors, one or more first clustering models to automatically group the one or more third users comprising one or more analogical characteristics, based on the selected one or more first hyperparameters;

scanning, by the one or more hardware processors, the grouped one or more third users comprising the one or more analogical characteristics, with the one or more first data points to identify at least one of: the one or more first dense regions as the one or more clusters and one or more isolated first data points as the one or more noises;

computing, by the one or more hardware processors, one or more pairwise distances between the one or more first data points;

determining, by the one or more hardware processors, whether the one or more first data points satisfy a predetermined criteria of the one or more first hyperparameters; and classifying, by the one or more hardware processors, the one or more first data points as at least one of: one or more first core data points indicating the one or more clusters, one or more first border data points, and one or more first noise data points indicating the one or more noises; and wherein the K-means clustering model is trained by one or more second hyperparameters comprising one or more number of clusters hyperparameters, one or more cluster initialization hyperparameters, maximum number of iteration hyperparameters, one or more relative tolerance hyperparameters, one or more verbose hyperparameters, and one or more random state hyperparameters;

determining, by the one or more hardware processors, the future cash flow for each cluster of the one or more clusters associated with the one or more third users;

computing, by the one or more hardware processors, the future cash flow for the one or more clusters associated with the one or more third users by adding the future cash flow determined for each cluster of the one or more clusters associated with the one or more third users, for the one or more entities associated with one or more first customers; and providing, by the one or more hardware processors, an output of the computed future cash flow for the one or more entities associated with the one or more first users, to the one or more second users on a user interface associated with one or more electronic devices.

2. The machine-learning based (ML-based) computing method of claim 1, wherein:

the one or more first users comprise at least one of: one or more organizations, one or more corporations, one or more parent companies, one or more subsidiaries, one or more joint ventures, one or more partnerships, one or more governmental bodies, one or more associations, and one or more legal entities;

the one or more second users comprises at least one of: one or more data analysts, one or more business analysts, one or more cash analysts, one or more financial analysts, one or more collection analysts, one or more debt collectors, and one or more professionals associated with cash and collection management; and the one or more third users comprises at least one of: one or more employees of the one or more first users, the one or more employees in each department, the one or more employees in each geographical location, the one or more employees in each hierarchy comprising a top level management with the one or more employees, a middle level management with the one or more employees, and one or more frontline employees.

3. The machine-learning based (ML-based) computing method of claim 1, wherein the second information associated with the one or more third users comprises at least one of: one or more identities associated with the one or more third users, one or more basic salaries, one or more allowances, one or more deductions, one or more overtime pays, one or more bonuses, one or more commissions, one or more benefits, one or more pay periods, one or more taxes, and one or more net salaries.

4. The machine-learning based (ML-based) computing method of claim 1, further comprising validating, by the one or more hardware processors, the DBSCAN model based on one or more validation datasets, by:

determining, by the one or more hardware processors, whether one or more first results of the one or more clusters associated with the one or more third users satisfy one or more first predetermined threshold results; and performing, by the one or more hardware processors, one or more first processes comprising at least one of: preprocessing of the one or more training datasets associated with the one or more features, adjusting of the one or more features, and adjusting of the one or more first hyperparameters, until the one or more first results of the one or more clusters associated with the one or more third users satisfy the one or more first predetermined threshold results.

5. The machine-learning based (ML-based) computing method of claim 1, wherein the K-means clustering model is trained by:

receiving, by the one or more hardware processors, the pre-processed one or more training datasets associated with the one or more features;

selecting, by the one or more hardware processors, the one or more second hyperparameters for training the K-means clustering model;

assigning, by the one or more hardware processors, one or more data points in the one or more training datasets to the closest centroid to automatically group the one or more third users comprising one or more analogical characteristics, based on the selected one or more second hyperparameters;

re-computing, by the one or more hardware processors, the centroids of each cluster by determining an average of the one or more data points in the one or more clusters;

repeating, by the one or more hardware processors, the assignment of the one or more data points and re-computation of centroids steps until the centroids remain unchanged significantly; and classifying, by the one or more hardware processors, the one or more data points as the one or more clusters associated with the one or more third users.

6. The machine-learning based (ML-based) computing method of claim 5, further comprising validating, by the one or more hardware processors, the K-means clustering model based on the one or more validation datasets, wherein validating the K-means clustering model comprises:

determining, by the one or more hardware processors, whether one or more second results of the one or more clusters associated with the one or more third users satisfy one or more second predetermined threshold results; and performing, by the one or more hardware processors, one or more second processes comprising at least one of: preprocessing of the one or more training datasets associated with the one or more features, adjusting of the one or more features, and adjusting of the one or more second hyperparameters, until the one or more second results of the one or more clusters associated with the one or more third users satisfy the one or more second predetermined threshold results.

7. The machine-learning based (ML-based) computing method of claim 1, further comprising re-training, by the one or more hardware processors, the at least one machine learning model over a plurality of time intervals based on one or more training data, wherein re-training the at least one machine learning model over the plurality of time intervals, comprises:

receiving, by the one or more hardware processors, the one or more training data associated with third information associated with the one or more third users, from the output subsystem;

adding, by the one or more hardware processors, the one or more training data with the one or more original training datasets comprising the second information associated with the one or more third users to generate one or more updated training datasets;

re-training, by the one or more hardware processors, the at least one machine learning model to update one or more training configurations of a cluster generation subsystem; and executing, by the one or more hardware processors, the at least one re-trained machine learning model in the cluster generation subsystem to generate the one or more clusters associated with the one or more third users.

8. A machine learning based (ML-based) computing system for computing future cash flow for one or more first users, the ML-based computing system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

a data receiving subsystem configured to receive one or more inputs from one or more second users, wherein the one or more inputs comprise first information related to at least one of: one or more entities associated with the one or more first users, and a forecast period associated with a time duration during which the one or more second users are adapted to compute the future cash flow for the one or more entities associated with the one or more first users;

a data extraction subsystem configured to extract one or more data associated with at least one of: one or more cash flow data of the one or more first users and second information associated with one or more third users, from one or more databases based on the one or more inputs received from the one or more second users, wherein the cash flow data comprise at least one of: one or more historical cash flow data and one or more real-time cash flow data;

a cluster feature generation subsystem configured to generate one or more features associated with the one or more third users based on the extracted one or more data associated with the one or more cash flow data of the one or more first users and the second information associated with the one or more third users, the cluster generation subsystem further configured to:

generate, by a frequency-based feature generation subsystem of the cluster feature generation subsystem, one or more frequency-based features based on at least one of: first payment frequency and second payment frequency, made to the one or more third users, wherein the first payment frequency is an average payment gap between one or more payrolls of the one or more third users, and wherein the second payment frequency is a recurrent payment day indicating a common day of one or more months on which one or more historical payrolls are performed for the one or more third users;

generate, by a distance-based feature generation subsystem of the cluster feature generation subsystem, one or more distance-based features based on at least one of: a distance from start of the one or more months and end of the one or more months, a distance from start of a quarter time period and end of the quarter time period, a distance from a predefined day of the one or more months, a distance from a last business day of the one or more months, and a distance from a last transaction; and generate, by a seasonality-based feature generation subsystem of the cluster feature generation subsystem, one or more seasonality-based features based on at least one of: a mode of one or more days of the one or more months and the mode of one or more weekdays, wherein the mode of one or more days of the one or more months is configured to identify a recurrent day in the one or more months for the one or more third users based on the one or more historical payrolls, and wherein the mode of the one or more weekdays is configured to determine the recurrent day of one or more weeks for one or more payroll transactions by filtering one or more noises comprising at least one of: one or more holidays and one or more bank issues;

a training subsystem configured to train at least one machine learning model, wherein in training the at least one machine learning model, the training subsystem is configured to:

receive one or more training datasets associated with the one or more features, from the cluster feature generation subsystem; and pre-process the one or more training datasets associated with the one or more features to convert one or more numerical values of the one or more features to one or more common scale values by at least one of:

normalizing, by the one or more hardware processors, the one or more numerical values of the one or more features to one or more standardized ranges comprising zero and one; and standardizing, by the one or more hardware processors, the one or more numerical values of the one or more features to obtain a mean value of zero and a standard deviation of one;

a cluster generation subsystem configured to generate one or more clusters associated with the one or more third users of the one or more entities associated with the one or more first users based on the one or more features, using the at least one machine learning model, wherein the machine learning model comprises at least one of a density-based spatial clustering of applications with noise (DBSCAN) model and a K-means clustering model;

wherein the DBSCAN model is trained by one or more first hyperparameters comprising an epsilon hyperparameter and a minimum sample hyperparameter;

wherein in training the DBSCAN model, the training subsystem is configured to:

receive the pre-processed one or more training datasets associated with the one or more features;

select one or more first hyperparameters for training the DBSCAN model, wherein the epsilon hyperparameter indicates a radius within which one or more first data points are indicated as one or more neighbors, and wherein the minimum sample hyperparameter is configured to generate one or more first dense regions by determining a predetermined number of the one or more first data points required within the radius;

generate one or more first clustering models to automatically group the one or more third users comprising one or more analogical characteristics, based on the selected one or more first hyperparameters;

scan the grouped one or more third users comprising the one or more analogical characteristics, with the one or more first data points to identify at least one of: the one or more first dense regions as the one or more clusters and one or more isolated first data points as the one or more noises;

compute one or more pairwise distances between the one or more first data points;

determine whether the one or more first data points satisfy a predetermined criteria of the one or more first hyperparameters; and classify the one or more first data points as at least one of: one or more first core data points indicating the one or more clusters, one or more first border data points, and one or more first noise data points indicating the one or more noises; and wherein the K-means clustering model is trained by one or more second hyperparameters comprising one or more number of clusters hyperparameters, one or more cluster initialization hyperparameters, maximum number of iteration hyperparameters, one or more relative tolerance hyperparameters, one or more verbose hyperparameters, and one or more random state hyperparameters;

a cash flow computing subsystem configured to:

determine the future cash flow for each cluster of the one or more clusters associated with the one or more third users; and compute the future cash flow for the one or more clusters associated with the one or more third users by adding the future cash flow computed for each cluster of the one or more clusters associated with the one or more third users, for the one or more entities associated with one or more first customers; and an output subsystem configured to provide an output of the computed future cash flow for the one or more entities associated with the one or more first users, to the one or more second users on a user interface associated with one or more electronic devices.

9. The machine-learning based (ML-based) computing system of claim 8, wherein:

the one or more first users comprise at least one of: one or more organizations, one or more corporations, one or more parent companies, one or more subsidiaries, one or more joint ventures, one or more partnerships, one or more governmental bodies, one or more associations, and one or more legal entities;

the one or more second users comprises at least one of: one or more data analysts, one or more business analysts, one or more cash analysts, one or more financial analysts, one or more collection analysts, one or more debt collectors, and one or more professionals associated with cash and collection management; and the one or more third users comprises at least one of: one or more employees of the one or more first users, the one or more employees in each department, the one or more employees in each geographical location, the one or more employees in each hierarchy comprising a top level management with the one or more employees, a middle level management with the one or more employees, and one or more frontline employees.

10. The machine-learning based (ML-based) computing system of claim 8, wherein the training subsystem is further configured to validate the DBSCAN model based on one or more validation datasets, wherein in validating the DBSCAN model, the training subsystem is configured to:

determine whether one or more first results of the one or more clusters associated with the one or more third users satisfy one or more first predetermined threshold results; and perform one or more first processes comprising at least one of: preprocessing of the one or more training datasets associated with the one or more features, adjusting of the one or more features, and adjusting of the one or more first hyperparameters, until the one or more first results of the one or more clusters associated with the one or more third users satisfy the one or more first predetermined threshold results.

11. The machine-learning based (ML-based) computing system of claim 8, wherein in training the K-means clustering model, the training subsystem is configured to:

receive the pre-processed one or more training datasets associated with the one or more features;

select one or more second hyperparameters for training the K-means clustering model;

assigning, by the one or more hardware processors, one or more data points in the one or more training datasets to the closest centroid to automatically group the one or more third users comprising one or more analogical characteristics, based on the selected one or more second hyperparameters;

re-computing, by the one or more hardware processors, the centroids of each cluster by determining an average of the one or more data points in the one or more clusters;

repeating, by the one or more hardware processors, the assignment of the one or more data points and re-computation of centroids steps until the centroids remain unchanged significantly; and classifying, by the one or more hardware processors, the one or more data points as the one or more clusters associated with the one or more third users.

12. The machine-learning based (ML-based) computing system of claim 11, wherein the training subsystem is further configured to validate the K-means clustering model based on the one or more validation datasets, and wherein in validating the K-means clustering model, the training subsystem is configured to:

determine whether one or more second results of the one or more clusters associated with the one or more third users satisfy one or more second predetermined threshold results; and perform one or more second processes comprising at least one of: preprocessing of the one or more training datasets associated with the one or more features, adjusting of the one or more features, and adjusting of the one or more second hyperparameters, until the one or more second results of the one or more clusters associated with the one or more third users satisfy the one or more second predetermined threshold results.

13. The machine-learning based (ML-based) computing system of claim 8, wherein the training subsystem is further configured to re-train the at least one machine learning model over a plurality of time intervals based on one or more training data, wherein in re-training the at least one machine learning model over the plurality of time intervals, the training subsystem is configured to:

receive the one or more training data associated with third information associated with the one or more third users, from the output subsystem;

add the one or more training data with the one or more original training datasets comprising the second information associated with the one or more third users to generate one or more updated training datasets;

re-train the at least one machine learning model to update one or more configurations of a cluster generation subsystem; and execute the at least one re-trained machine learning model in the cluster generation subsystem to generate the one or more clusters associated with the one or more third users.

14. A non-transitory computer-readable storage medium having instructions stored therein that when executed by a hardware processor, cause the processor to execute operations of:

receiving one or more inputs from one or more second users, wherein the one or more inputs comprise first information related to at least one of: one or more entities associated with the one or more first users, and a forecast period associated with a time duration during which the one or more second users compute the future cash flow for the one or more entities associated with the one or more first users;

extracting one or more data associated with at least one of: one or more cash flow data of the one or more first users and second information associated with one or more third users, from one or more databases based on the one or more inputs received from the one or more second users, wherein the cash flow data comprise at least one of: one or more historical cash flow data and one or more real-time cash flow data;

generating one or more features associated with the one or more third users based on the extracted one or more data associated with the one or more cash flow data of the one or more first users and the second information associated with the one or more third users, by;

generating one or more frequency-based features based on at least one of: first payment frequency and second payment frequency, made to the one or more third users, wherein the first payment frequency is an average payment gap between one or more payrolls of the one or more third users, and wherein the second payment frequency is a recurrent payment day indicating a common day of one or more months on which one or more historical payrolls are performed for the one or more third users;

generating one or more distance-based features based on at least one of: a distance from start of the one or more months and end of the one or more months, a distance from start of a quarter time period and end of the quarter time period, a distance from a predefined day of the one or more months, a distance from a last business day of the one or more months, and a distance from a last transaction; and generating one or more seasonality-based features based on at least one of: a mode of one or more days of the one or more months and the mode of one or more weekdays, wherein the mode of one or more days of the one or more months is configured to identify a recurrent day in the one or more months for the one or more third users based on the one or more historical payrolls; and wherein the mode of the one or more weekdays is configured to determine the recurrent day of one or more weeks for one or more payroll transactions by filtering one or more noises comprising at least one of: one or more holidays and one or more bank issues;

training at least one machine learning model, by:

receiving one or more training datasets associated with the one or more features, from a cluster feature generation subsystem; and pre-processing the one or more training datasets associated with the one or more features to convert one or more numerical values of the one or more features to one or more common scale values by at least one of:

normalizing the one or more numerical values of the one or more features to one or more standardized ranges comprising zero and one; and standardizing the one or more numerical values of the one or more features to obtain a mean value of zero and a standard deviation of one;

generating one or more clusters associated with the one or more third users of the one or more entities associated with the one or more first users based on the one or more features, using the at least one machine learning model, wherein the machine learning model comprises at least one of a density-based spatial clustering of applications with noise (DBSCAN) model and a K-means clustering model;

wherein the DBSCAN model is trained by one or more first hyperparameters comprising an epsilon hyperparameter and a minimum sample hyperparameter;

wherein the DBSCAN model is trained by:

receiving the pre-processed one or more training datasets associated with the one or more features;

selecting the one or more first hyperparameters for training the DBSCAN model, wherein the epsilon hyperparameter indicates a radius within which one or more first data points are indicated as one or more neighbors, and wherein the minimum sample hyperparameter is configured to generate one or more first dense regions by determining a predetermined number of the one or more first data points required within the radius;

generating one or more first clustering models to automatically group the one or more third users comprising one or more analogical characteristics, based on the selected one or more first hyperparameters;

scanning the grouped one or more third users comprising the one or more analogical characteristics, with the one or more first data points to identify at least one of: the one or more first dense regions as the one or more clusters and one or more isolated first data points as the one or more noises;

computing one or more pairwise distances between the one or more first data points;

determining whether the one or more first data points satisfy a predetermined criteria of the one or more first hyperparameters; and classifying the one or more first data points as at least one of: one or more first core data points indicating the one or more clusters, one or more first border data points, and one or more first noise data points indicating the one or more noises; and wherein the K-means clustering model is trained by one or more second hyperparameters comprising one or more number of clusters hyperparameters, one or more cluster initialization hyperparameters, maximum number of iteration hyperparameters, one or more relative tolerance hyperparameters, one or more verbose hyperparameters, and one or more random state hyperparameters;

determining the future cash flow for each cluster of the one or more clusters associated with the one or more third users;

computing the future cash flow for the one or more clusters associated with the one or more third users by adding the future cash flow computed for each cluster of the one or more clusters associated with the one or more third users, for the one or more entities associated with one or more first customers; and providing an output of the computed future cash flow for the one or more entities associated with the one or more first users, to the one or more second users on a user interface associated with one or more electronic devices.

* * * * *